United States Patent [19]

Ketley et al.

[11] 4,125,644

[45] Nov. 14, 1978

[54] RADIATION CURED COATINGS FOR FIBER OPTICS

[75] Inventors: Arthur D. Ketley, Columbia; Charles R. Morgan, Brookeville, both of Md.

[73] Assignee: W. R. Grace & Co., New York, N.Y.

[21] Appl. No.: 795,997

[22] Filed: May 11, 1977

[51] Int. Cl.$^2$ .......................... G02B 1/10; G02B 5/14
[52] U.S. Cl. ........................................ 427/36; 427/38; 427/44; 427/54; 427/163
[58] Field of Search ...................... 427/36, 38, 44, 54, 427/163; 65/3 C

[56] References Cited

U.S. PATENT DOCUMENTS 3,999,834   12/1976   Ohtomo et al. .................. 427/164 X

OTHER PUBLICATIONS

Vazirani et al., "U.V. Cured Epoxy-Acrylate Coatings on Optical Fibers I. Chemistry and Application" Feb. 22, 1977.

*Primary Examiner*—James R. Hoffman
*Attorney, Agent, or Firm*—Richard P. Plunkett; William W. McDowell, Jr.

[57] ABSTRACT

A continuous protective coating is formed on a fiber optic by coating said fiber optic in a bath of a liquid radiation curable composition at a temperature up to 90° C and thereafter exposing the coated conductor to ultraviolet or high energy ionizing radiation to cure the coating.

6 Claims, 4 Drawing Figures

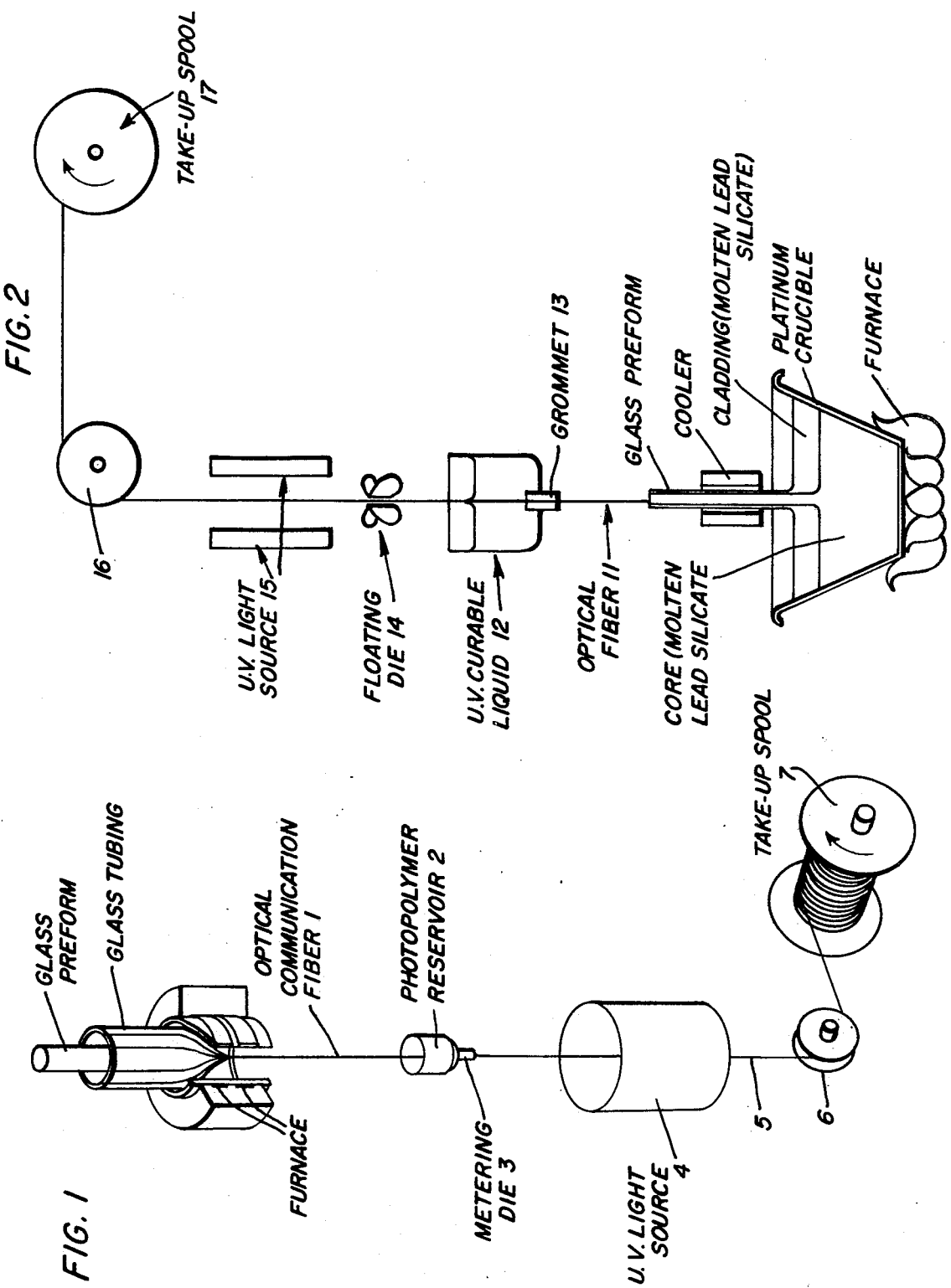

RADIATION CURED COATINGS FOR FIBER OPTICS

This invention relates to fiber optic coating compositions and a method of applying same. More particularly, this invention is directed to coating fiber optics with a liquid radiation curable composition and, thereafter, exposing said coated fiber to U.V. or high energy ionizing radiation to cure said composition. Such coatings must be applied to a glass fiber immediately the fiber is pulled from the melt. This prevents surface damage to the fiber as it passes over pulleys and spools. Such surface damage results in a great loss in strength of the fiber making it difficult to cable and handle in the field.

The use of optical fibers as a means of transmitting data has received widespread interest recently. Information transfer using a modulated light beam guided by a glass or plastic fiber has been utilized for many applications including telecommunications and computer link-up and data bus use. Advantages of the use of fiber optic linkages are very high information carrying capacity compared to metal wires carrying electrical signals and freedom from external interference. A review of the current state-of-the-art is contained in the article "Fiber-Optic Developments Spark Worldwide Interest", published in Electronics, Aug. 5, 1975, pages 81–104.

The greatest drawbacks of glass fiber are weak mechanical properties causing proneness to breakage and delicacy which makes handling difficult. Hence the need of reinforcement by any means possible to make it easy to handle but hard to break. Methods of glass fiber reinforcement are considered as follows: (1) painting to, (2) cladding with micro-diameter metal piping, (3) extruding plastics cladding. Presently, the plastic extrusion approach is the most excellent in view of the possibility to extrude longer products and the ease with which arbitrary diametral products can be produced. In addition to such cladding an absorption layer must be provided to prevent crosstalk between optical lines.

Present day methods of coating fiber optics with polymers are solvent coating and extrusion. Solvent coating involves the use of compositions which are applied in a solvent and, thereafter, heated to both drive off the solvent and adhere the composition on the fiber. Disadvantages of the solvent coating system are:

(1) pollution of the atmosphere or environment due to the solvent;

(2) the necessity of coating the fiber many times to build up the required coating thickness; or (3) the necessity of handling high solids solutions with attendant problems of bubbling of the coating.

The drawbacks of the present day extrusion methods include both (a) the necessity of using thermoplastic materials which have a relatively high modulus leading to transmission loss in the fiber and (b) the inability to form a coating which has a thickness less than 10 mils.

One object of the instant invention is a process for coating or cladding optical fiber with a crosslinkable polymeric material which does not require a solvent. Another object of the instant invention is a process for coating optical fiber which does not require the optical fiber to be excessively heated in order to form a cured coating thereon. A third object of the instant invention is to produce a process for coating optical fiber wherein the coating can be rapidly cured by exposure to U.V. or high energy ionizing radiation. Another object of the present invention is to provide a coating over a broad thickness range (0.2–40 mils/pass) for a fiber optic.

These and other objects and advantages of the instant invention will become more apparent from a study of the following specification when considered in conjunction with the accompanying drawings in which:

FIG. 1 is a schematic view illustrating one embodiment of the process of the instant invention wherein the fiber is made by the single precision drawing process and the coating is cured while exiting the bath of the radiation curable composition downwards in a vertical direction; and FIG. 2 is a schematic view illustrating another embodiment of the process of the present invention wherein the fiber is made by the stratified melt process and the coating on the optical fiber is cured as the optical fiber exits the bath in a vertical direction upwards.

Figure 3:
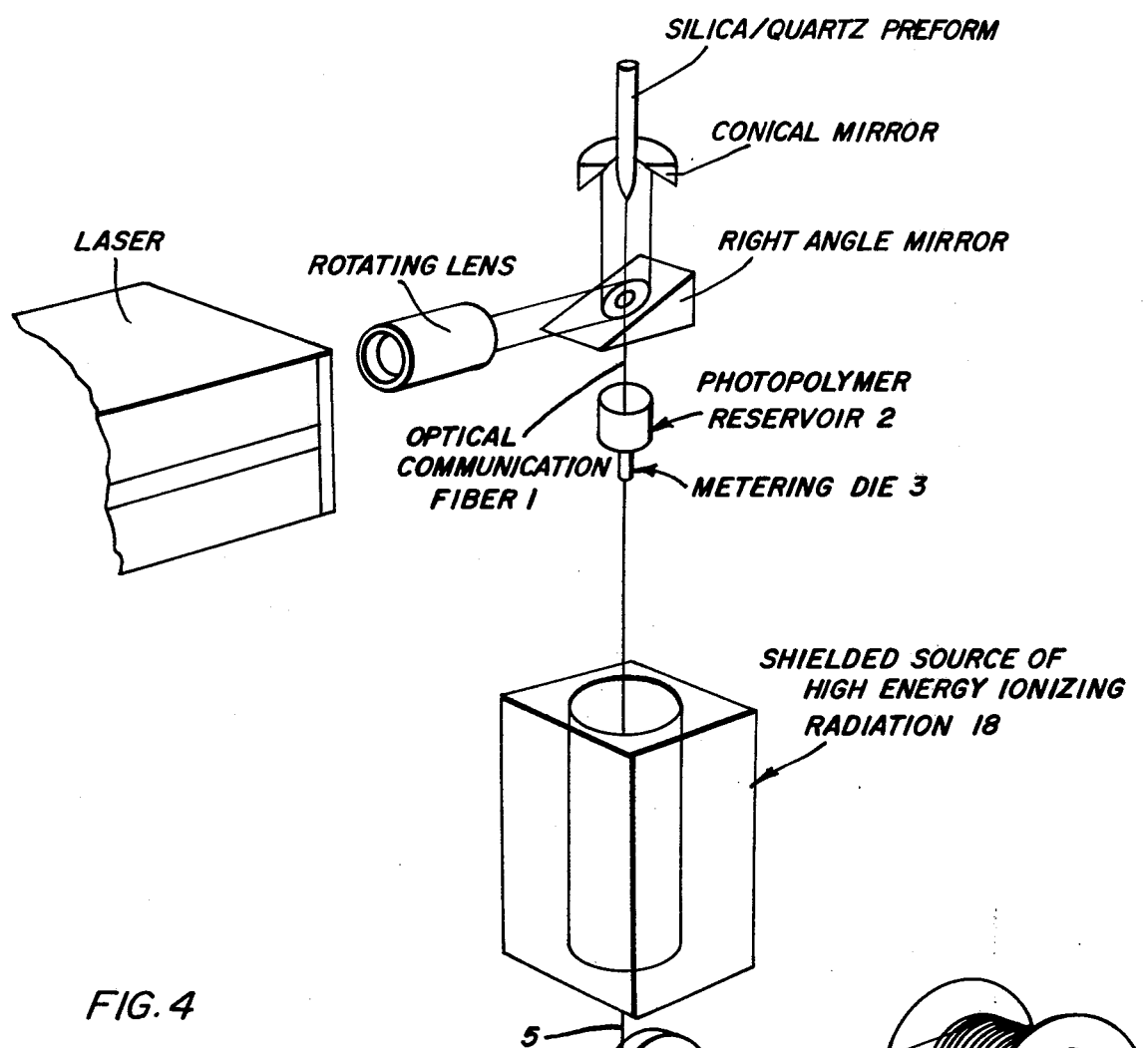
FIG. 3 shows an embodiment of the process when used in conjunction with the laser drawing process for fiber fabrication.
Figure 4:
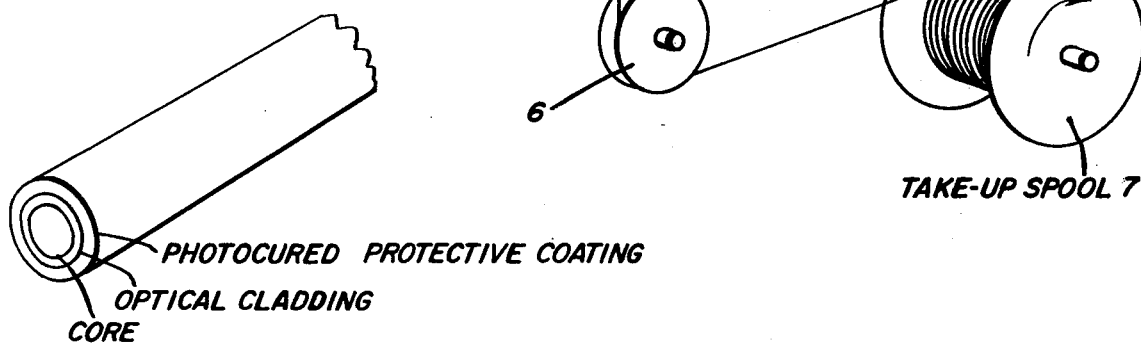
FIG. 4 shows an optical fiber with a photocured coating thereon.

Referring to FIG. 1, uncoated fiber 1 is passed down into a liquid bath of a radiation curable composition 2 and the resulting coated fiber metered to the required coating thickness by a die 3.

The coated fiber is then passed through a U.V. lamp bank 4 at such a rate that the radiation curable composition is completely cured by the time it exits the lamp bank. The cured coated fiber 5 is then passed over guide roll 6, is rolled up on take-up roll 7 and is ready for use.

In FIG. 2 is shown another embodiment of the instant invention. Therein a fiber 11 formed by the stratified melt process is passed into a container of U.V.-curable liquid 12 through a grommet 13 in the bottom of the container. The grommet is designed to be lubricated by the photopolymer so that the fiber does not directly contact the grommet. The excess photopolymer is then metered off by a floating die 14 after which it is cured by the U.V. light 15. The coated fiber then proceeds over guide roll 16 to the take-up spool 17.

FIG. 3 shows an embodiment in which the coating process shown in FIG. 1 is used to coat fiber prepared by the laser drawing process except that high energy ionizing radiation 18 instead of U.V. is used to cure the coating on the fiber.

The liquid radiation curable compositions operable in the instant invention are many and varied. As used herein, the terms "cured" or "crosslinked" means that the material after being subjected to radiation results in a solid three dimensional network. One radiation curable composition operable herein is that set out in U.S. Pat. No. 3,647,498 incorporated hereby by reference. Therein the composition consists of:

A. a solid phase consisting essentially of polymers or copolymers of esters of methacrylic acid with glass transition temperatures of 75° C. or less and B. a polymerizable liquid phase consisting essentially of 1. from 70 to 90 percent by weight of a polyglycol dimethacrylate and 2. 10 to 20 percent by weight of bis-phenol A dimethacrylate, said solid phase and polymerizable liquid phase being present in a range of 40–80 percent and 20 to 60 percent by weight, respectively.

Another operable radiation curable system incorporated herein by reference is that set out in U.S. Pat. No.

2,760,863 wherein the radiation polymerizable coating comprises (1) an addition polymerizable ethylenically unsaturated component capable of forming a high polymer by photoinitiated polymerization in the presence of an addition polymerization initiator therefor activatable by actinic light and (2) a small amount of such an initiator.

This photopolymerizable composition may be composed of any addition polymerizable monomer including mixtures of two, three or more monomers and any initiator photosensitive to actinic light either singly or in admixture with other initiators. Because of their availability and lower cost, the terminal monoethylenically unsaturated monomers, i.e., the vinylidene monomers particularly the vinyl monomers are preferred. These monomers include the vinyl carboxylates or precursors thereto, e.g., those wherein the vinyl group is in the acid portion of the molecule, such as acrylic acid and its esters, e.g., methyl acrylate, ethyl acrylate, n-butyl acrylate; acrylonitrile, methylacrylonitrile; the $\alpha$-alkyl acrylates such as methacrylic acid and ethacrylic acid and their esters such as methyl-n-propyl, n-butyl, isopropyl and cyclohexyl meth- and ethacrylates and the like; alpha-substituted acrylic acids and esters thereof, such as ethyl $\alpha$-chloroacrylate, ethyl $\alpha$-cyanoacrylate and the like; those vinyl components wherein the vinyl group is in the non-acid portion of the molecule, such as the vinyl esters, e.g., vinyl acetate, vinyl chloroacetate, vinyl trimethylacetate, vinyl propionate, vinyl benzoate, and the like; vinyl hydrocarbons, e.g., the vinyl aryls, such as styrene and the like; the vinylidene halides, such as vinylidene chloride. The just described monomers and mixtures of two or more monomers are liquids which boil above room temperature and should be chosen to give coherent, mechanically-strong polymeric films by bulk polymerization techniques. Of these monomers, because of their relatively high rates of photoinitiated polymerization, the vinyl aryls and/or esters or acrylic and alpha-substituted acrylic acids with solely hydrocarbon monoalcohols of no more than 6 carbons and particularly the lower alkanols of 1 to 4 carbon atoms, are preferred. Styrene and the alkyl hydrocarbon substituted acrylic acids wherein the alkyl groups contain 1 to 4 carbon atoms are particularly preferred.

Practically any initiator or catalyst of addition polymerization which is capable of initiating polymerization under the influence of actinic light can be used in the radiation polymerizable composition set out in U.S. Pat. No. 2,760,863. The preferred catalysts or initiators of addition polymerization are not activatable thermally and preferably are soluble in the polymerizable monomer to the extent necessary for initiating the desired polymerization under the influence of the amount of light energy absorbed in the relatively short term exposures used in the process of this invention. The photoinitiators most useful for this process are those which are not active thermally at temperatures below 80°–85° C. These photopolymerization initiators are used in amounts of from 0.05 to 5% and preferably from 0.1 to 2.0% based on the weight of the total radiation polymerizable composition.

Suitable photopolymerization initiators or catalysts include vicinal ketaldonyl compounds such as diacetyl, benzil, etc. $\alpha$-ketaldonyl alcohols such as benzoin, pivaloin, etc.; acyloin ethers such as benzoin methyl or ethyl ethers; alpha-hydrocarbon substituted aromatic acyloins including $\alpha$-methylbenzoin, $\alpha$-allylbenzoin, and $\alpha$-phenylbenzoin.

Most commercially available polymerizable monomers and polymers discussed previously for use in the radiation polymerizable compositions normally contain minor amounts (about 50–100 parts per million by weight) of polymerization inhibitors so as to prevent spontaneous polymerization before desired. The presence of these inhibitors, which are usually of the anti-oxidant type. e.g., hydroquinone, tertiary butyl catechols and the like in such amounts causes substantially no undesirable results in the radiation polymerizable layers of this invention either as to speed or quality of polymerization.

When high energy ionizing irradiation is used to cure any of the compositions herein, it is not necessary to have a photo-polymerization initiator, catalyst or curing rate accelerator present in the composition.

Another radiation curable material which can be exposed to radiation to form a coating on a fiber optic is that set out in U.S. Pat. No. 3,645,730, assigned to W. R. Grace and incorporated herein by reference. Therein a radiation curable composition comprising a liquid polyfunctional component having molecules containing at least 2 reactive ethylenically or acetylenically unsaturated carbon to carbon bonds per molecule and a liquid polythiol component having molecules containing at least 2 thiol groups per molecule with the total functionality of the polyfunctional component and the polythiol component being greater than 4 is employed. A photocuring rate accelerator is added if curing is by U.V. radiation.

The crucial ingredients in this radiation curable composition are:

(1) about 2 to about 98 parts by weight of an ethylenically unsaturated polyene containing two or more reactive unsaturated carbon to carbon bonds; and (2) about 98 to about 2 parts by weight of a polythiol; the total functionality of the unsaturated carbon to carbon bonds in the polyene and the thiol groups per molecule in the polythiol being greater than 4. If UV radiation is used for curing, about 0.0005 to about 50 parts by weight [based on 100 parts by weight of (1) and (2)] of a photocuring rate accelerator is added to the composition. The preferred range of accelerator is about 0.05 to about 30 parts by weight of the polyene and polythiol.

The reactive carbon to carbon bonds of the polyenes are preferably located terminally, near terminally, and/or pendant from the main chain. The polythiols, preferably, contain two or more thiol groups per molecule. These radiation curable compositions are usually, and preferably, liquid at room temperature (25° C.) although the compositions can be solid, crystalline, semi-solid, etc., at room temperature, but which are liquid at 90° C.

Included in the term "liquid", as used herein, are those radiation curable compositions which in the presence of reactive plasticizers such as diallyl phthalate and/or reactive diluents such as vinyl acetate, ethylene glycol dimethacrylate, N-vinyl pyrrolidone ethoxyethoxyethylacrylate, methylacrylate, methylmethacrylate, have a viscosity ranging from essentially zero to 20 million centipoises at 70° C.

As used herein polyenes and polyynes refer to simple or complex species of alkenes or alkynes having a multiplicity, i.e., at least 2, "reactive" carbon to carbon unsaturated functional groups per average molecule. For example, a diene is a polyene that has two "reactive" carbon to carbon double bonds per average molecule, while a diyne is a polyyne that contains in its structure two "reactive" carbon to carbon triple bonds per average molecule. Combinations of "reactive" double bonds and "reactive" triple bonds within the same molecule are also operable. An example of this is monovinylacetylene, which is a polyeneyne under our definition. For purposes of brevity all these classes of compounds will be referred to herein as polyenes.

As used herein the term "reactive" unsaturated carbon to carbon groups means groups which will react under proper conditions as set forth herein with thiol groups to yield the thioether linkage

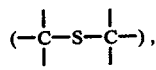

as contrasted to the term "unreactive" carbon to carbon unsaturation which means

groups when found in aromatic nucleii (cyclic structures exemplified by benzene, pyridine, anthracene, tropolone and the like) which do not under the same conditions react with thiols to give thioether linkages. In the instant invention products from the reaction of polyenes with polythiols which contain 2 or more thiol groups per average molecule are called cured polythioethers.

One group of polyenes operable in the instant invention with polythiols to form cured polythioethers is that taught in an application having Ser. No. 617,801, filed: Feb. 23, 1967, and assigned to W. R. Grace & Co. and now abandoned. This group includes those having a molecular weight in the range of about 50 to 20,000, a viscosity ranging from 0 to 20 million centipoises at 70° C. of the general formula: $[A-X]_m$ wherein X is a member of the group consisting of

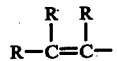

and R—C≡C—; $m$ is at least 2; R is independently selected from the group consisting of hydrogen, halogen, aryl, substituted aryl, cycloalkyl, substituted cycloalkyl, aralkyl, substituted aralkyl and alkyl and substituted alkyl groups containing 1 to 16 carbon atoms and A is a polyvalent organic moiety free of (1) reactive carbon to carbon unsaturation and (2) unsaturated groups in conjugation with the reactive ene or yne groups in X. Thus A may contain cyclic groupings and minor amounts of hetero atoms such as N, S, P or O but contains primarily carbon-carbon, carbon-oxygen or silicon-oxygen containing chain linkages without any reactive carbon to carbon unsaturation.

In this first group, the polyenes are simple or complex species of alkenes or alkynes having a multiplicity of pendant, terminally or near terminally positioned "reactive" carbon to carbon unsaturated functional groups per average molecule. As used herein for determining the position of the reactive functional carbon to carbon unsaturation, the term "terminal" means that said functional unsaturation is at an end of the main chain in the molecule; whereas by "near terminal" is meant that the functional unsaturation is not more than 16 carbon atoms away from an end of the main chain in the molecule. The term "pendant" means that the reactive carbon to carbon unsaturation is located terminally or near terminally in a branch of the main chain as contrasted to a position at or near the ends of the main chain. For purposes of brevity all of these positions will be referred to generally as "terminal" unsaturation.

The liquid polyenes operable in this first group contain one or more of the following types of non-aromatic and non-conjugated "reactive" carbon to carbon unsaturation:

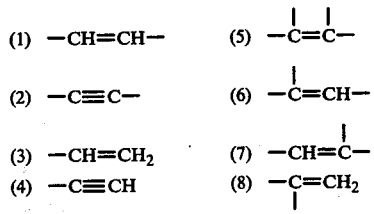

These functional groups as shown in 1–8 supra are situated in a position either which is pendant, terminal or near terminal with respect to the main chain but are free of terminal conjugation. As used herein the phrase "free of terminal conjugation" means that the terminal "reactive" unsaturated groupings may not be linked directly to nonreactive unsaturated species as

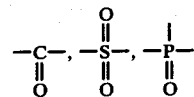

and the like so as to form a conjugated system of unsaturated bonds exemplified by the following structure:

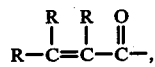

etc. On the average the polyenes must contain 2 or more "reactive" unsaturated carbon to carbon bonds/molecule and have a viscosity in the range from slightly above 0 to 20 million centipoises at 70° C. Included in the term "polyenes" as used herein are those materials which in the presence of an inert solvent, aqueous dispersion or plasticizer fall within the viscosity range set out above at 70° C. Operable polyenes in the instant invention have molecular weights in the range of about 50 to about 20,000, preferably about 500 to about 10,000.

Examples of operable polyenes from this first group include, but are not limited to:

(1) crotyl-terminated polyurethanes which contain two "reactive" double bonds per average molecule in a near terminal position of the average general formula:

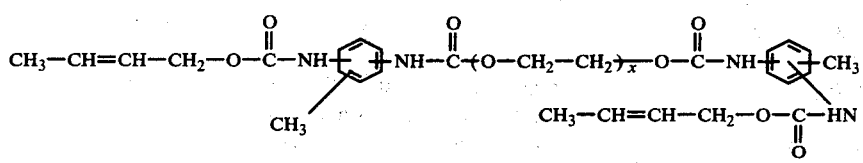

wherein x is at least 1, (2) ethylene/propylene/non-conjugated diene terpolymers, such as "Nordel 1040" manufactured by E. I. duPont de Nemours & Co., Inc., which contains pendant "reactive" double bonds of the formula: —CH$_2$—CH=CH—CH$_3$, (3) The following structure which contains terminal "reactive" double bonds:

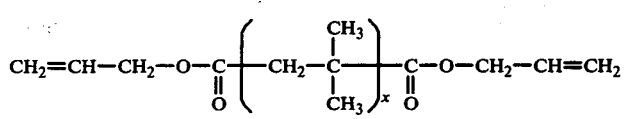

where x is at least 1.

(4) The following structure which contains near terminal "reactive" double bonds

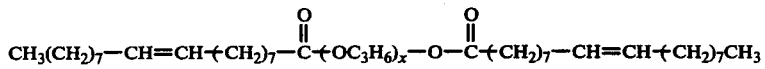

where x is at least 1.

Another group of operable polyenes includes those unsaturated polymers in which the double or triple bonds occur primarily within the main chain of the molecules. Examples include conventional elastomers (derived primarily from standard diene monomers) such as polyisoprene, polybutadiene, styrene-butadiene rubber, isobutylene-isoprene rubber, polychloroprene, styrene-butadiene-acrylonitrile rubber and the like; unsaturated polyesters, polyamides, and polyurethanes derived from monomers containing "reactive" unsaturation, e.g., adipic acid-butenediol, 1,6-hexanediamine-fumaric acid and 2,4-tolylene diisocyanate-butenediol condensation polymers and the like.

A third group of polyenes operable in this invention include those polyenes in which the reactive unsaturated carbon to carbon bonds are conjugated with adjacent unsaturated groupings. Examples of operable conjugated reactive ene systems include but are not limited to the following:

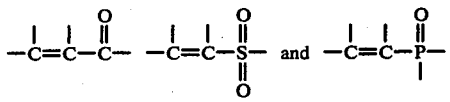

A few typical examples of polymeric polyenes which contain conjugated reactive double bond groupings such as those described above are poly(oxyethylene) glycol (600 M.W.) diacrylate, poly(oxytetramethylene) glycol (1000 M.W.) dimethacrylate, the triacrylate of the reaction product of trimethylol propane with 20 moles of ethylene oxide, and the like.

Any ethylenically unsaturated compound containing more than one carbon to carbon double bond is operable in the instant invention to form polythioethers when cured with polythiols. For example, allylic and acrylic terminated monomers, prepolymers and mixtures thereof are operable herein to form polythioether coatings when radiation cured with polythiols in accord with the instant invention. Additionally, any acrylic terminated polyene is operable herein either per se or in combination with a polythiol to form a cured coating on the optical fiber. In addition, other functional groups such as esters, ethers, ketones, halides, amides and hydroxyls can also be present in the ethylenically unsaturated compound. The hydrocarbon moieties of these compounds may be straight-chained or branched, aromatic, aliphatic or cycloaliphatic.

Methods of preparing various polyenes useful within the scope of this invention are disclosed in U.S. Pat. No. 4,008,341 and U.S. Pat. No. 3,661,744 incorporated herein by reference. A useful polyene is prepared in a detailed example, set forth in the instant specification.

As used herein, the term polythiols refers to simple or complex organic compounds having a multiplicity of pendant or terminally positioned —SH functional groups per average molecule.

On the average the polythiols must contain 2 or more —SH groups/molecule. They usually have a viscosity range of slightly above 0 to about 20 million centipoises (cps) at 70° C., as measured by a Brookfield Viscometer. Included in the term "polythiols" as used herein are those materials which in the presence of reactive plasticizers such as diallyl phthalate fall within the viscosity range set out above at 70° C. Operable polythiols in the instant invention usually have molecular weights in the range about 94 to about 20,000 or more, preferably about 100 to about 10,000.

The polythiols operable in the instant invention can be exemplified by the general formula: $R_8(SH)_n$ where $n$ is at least 2 and $R_8$ is a polyvalent organic moiety free from "reactive" carbon to carbon unsaturation. Thus $R_8$ may contain cyclic groupings and minor amounts of hetero atoms such as N, S, P or O but primarily contains carbon-hydrogen, carbon-oxygen, or silicone-oxygen containing chain linkages free of any "reactive" carbon to carbon unsaturation.

One class of polythiols operable with polyenes in the instant invention to obtain essentially odorless cured polythioether coatings on optical fibers are esters of thiol-containing acids of the general formula: HS—R$_9$—COOH where R$_9$ is an organic moiety containing no "reactive" carbon to carbon unsaturation with polyhydroxy compounds of the general structure: $R_{10}$—OH)$_n$ where $R_{10}$ is an organic moiety containing no "reactive" carbon to carbon unsaturation and $n$ is 2 or greater. These components will react under suitable conditions to give a polythiol having the general structure

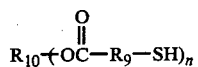

$$R_{10}\text{+OC}-R_9-\text{SH})_n$$

where $R_9$ and $R_{10}$ are organic moieties containing no "reactive" carbon to carbon unsaturation and $n$ is 2 or greater.

Certain polythiols such as the aliphatic monomeric polythiols (ethane dithiol, hexamethylene dithiol, decamethylene dithiol, tolylene-2,4-dithiol, etc.) and some polymeric polythiols such as a thiol-terminated ethylcyclohexyl dimercaptan polymer, etc. and similar polythiols which are conveniently and ordinarily synthesized on a commercial basis, although having obnoxious odors, are operable in this invention. Examples of the polythiol compounds preferred for this invention because of their relatively low odor level and fast curing rate include but are not limited to esters of thioglycolic acid (HS—CH$_2$COOH), α-mercaptopropionic acid (HS—CH(CH$_3$)—COOH and β-mercaptopropionic acid (HS—CH$_2$CH$_2$COOH) with polyhydroxy compounds such as glycols, triols, tetraols, penatols, hexaols, etc. Specific examples of the preferred polythiols include but are not limited to ethylene glycol bis(thioglycolate), ethylene glycol bis(β-mercaptopropionate), trimethylolpropane tris(thioglycolate, trimethylolpropane tris(β-mercaptopropionate), pentaerythritol tetrakis(thioglycolate) and pentaerythritol tetrakis(β-mercaptopropionate), all of which are commercially available. A specific example of a preferred polymeric polythiol is polypropylene ether glycol bis(β-mercaptopropionate) which is prepared from polypropylene-ether glycol (e.g. Pluracol P2010, Wyandotte Chemical Corp.) and β-mercaptopropionic acid by esterification.

The preferred polythiol compounds are characterized by a low level of mercaptan-like odor initially, and after reaction, gives essentially odorless cured polythioether end products which are commercially useful resins or elastomers for coating fiber optics.

The curing reaction can be initiated by either UV radiation or high energy ionizing radiation. The UV radiation can be obtained from sunlight or special light sources which emit significant amounts of UV light having a wavelength in the range of about 2000 to about 4000 Angstrom units. When UV radiation is used for the curing reaction, a dose of 0.0004 to 60 watts/centimeter$^2$ is employed.

When UV radiation is used for curing a photosensitizer is added to the composition. The photopolymerization or photocuring reaction rate can be increased by the use of a photosensitizer, e.g., either a photoinitiator in a polymerization reaction or a curing rate accelerator as in a curing reaction or both. For example benzophenone when added to a liquid photopolymerizable composition, e.g. monomeric pentaerythritol triacrylate would be a photoinitiator whereas benzophenone would be a curing rate accelerator for the liquid polyene/polythiol photocurable composition when UV radiation is employed.

Various photosensitizers and photoinitators are operable and well known to those skilled in the art. Examples of photosensitizers and photoinitiators include, but are not limited to, benzophenone, acetophenone, acenaphthenequinone, methyl ethyl ketone, valerophenone, hexanophenone, α-phenylbutyrophenone, p-morpholinopropiophenone, dibenzosuberone, 4-morpholinobenzophenone, 4'morpholinodeoxybenzoin, p-diacetylbenzene, 4-aminobenzophenone, 4'-methoxyacetophenone, benzaldehyde, α-tetralone, 9-acetylphenanthrene, 2-acetylphenanthrene, 10-thioxanthenone, 3-acetylphenanthrene, 3-acetylindole, 9-fluorenone, 1-indanone, 1,3,5-triacetylbenzene, thioxanthen-9-one, xanthene-9-one, 7-H-benz[de]anthracene-7-one, 1-naphthaldehyde, 4,4'-bis(dimethylamino)benzophenone, fluorene-9-one, 1'-acetonaphthone, 2'-acetonaphthone, o-methoxybenzophenone, triphenylphosphine, tri-o-tolylphosphine, 1'-acetonaphthone, 2'-acetonaphthone, benz[a]anthracene 7,12 dione, 2,2-diethoxyacetophenone, 2,2-dimethoxy-2-phenylacetophenone and 2,3-butanedione, etc., which service to give greatly reduced exposure times and thereby, when used in conjunction with various forms of energetic radiation, yield very rapid, commercially practical time cycles by the practice of the instant invention. The photosensitizer, i.e., curing rate accelerators or photoinitiators, are usually added in an amount ranging from 0.00005 to 50% by weight.

The radiation curable compositions of the instant invention can also be cured by high energy ionizing irradiation. A preferred feature of the ionizing irradiation operation of the instant invention is treatment with high energy particle irradiation or by gamma-rays or X-rays. Irradiation employing particles in the instant invention includes the use of positive ions, (e.g., protons, alpha particles and deuterons), electrons or neutrons. The charged particles may be accelerated to high speeds by means of various voltage gradient mechanisms such as a Van de Graaff generator, a cyclotron, a Cockroft Walton accelerator, a resonant cavity accelerator, a betatron, a G.E. resonant transformer, a synchrotron or the like. Furthermore, particle irradiation may also be supplied from radioactive isotopes or an atomic pile. Gamma rays or X-rays may be obtained from radioisotopes (e.g. cobalt 60) or by particle bombardment of suitable target material (e.g., high energy electrons on a gold metal target).

The dose rate for the irradiation operable to cure the coating in the instant invention is in the range 0.00001 to 1000 megarads/second.

The amount of ionizing radiation which is employed in curing the radiation curable material in the instant invention can vary between broad limits. Radiation dosages of less than a megarad up to 10 megarads or more for electrons are operable, preferably 0.02 to 5 megarads energy absorbed are employed. For gamma-rays or X-rays, radiation dosages in the range 0.00001 to 5.0 megarads energy absorbed are operable. The irradiation step is ordinarily performed under ambient temperature conditions but can be performed at temperatures ranging from below room temperature up to temperatures of 90° C.

When using ionizing radiation, the depth of penetration is dependent upon the density of the material to be penetrated. When the ionizing irradiation is in the form of electrons, 0.2 to 12 million electron volts (mev.) are usually employed. Where gamma-rays or X-rays are employed, a range of 0.01 to 5.0 million electron volts is used. As aforestated, if such penetration is not sufficient to cure the coating to the entire depth desired when beaming the radiation from one direction only, one may use multiple radiation sources beaming simultaneously or intermittently from diametrically opposite sides of the coating. Furthermore, shielding can also be employed to increase penetration of the coating on the opposite side of the fiber optic away from the radiation source.

The compositions to be radiation cured, i.e., converted to coatings, in accord with the present invention, may, if desired, include such additives as antioxidants, inhibitors, activators, fillers, pigments, dyes, antistatic agents, flame-retardant agents, thickeners, thixotropic agents, surface-active agents, viscosity modifiers, plasticizers and the like within the scope of this invention. Such additives generally are preblended with the polyene or polythiol prior to coating it on the optical fibers. The aforesaid additives may be present in quantities up to 500 parts or more per 100 parts radiation curable composition by weight and preferably 0.0005 to 300 parts on the same basis. The type and concentration of the additives must be selected with care so that the final composition remains radiation curable under conditions of exposure.

Preferably, the bath of the radiation curable composition is at ambient conditions of temperature and pressure, i.e., atmospheric pressure and room temperature (25° C.), when used to coat optical fibers. In some cases, depending on the radiation curable composition, it may be necessary to heat the bath of the radiation curable composition at slightly elevated temperatures up to about 90° C., in order to insure that the composition is in liquid form.

The liquid radiation curable compositions operable in the instant invention usually have viscosities in the range of about 50 to about 500,000 centipoises at ambient temperatures (25° C.). Obviously, if the viscosity is too low, the liquid material will at best only put a thin coating on the optical fiber, thus necessitating repeated runs through the bath and the irradiation step to build up the desired coating thickness. On the other hand, if the viscosity is too high, the coating may be thicker than that desired. In any event, in all cases a die, e.g., a floating ball die, is inserted between the bath exit and the irradiation step to set the desired coating thickness and to prevent excess photosensitive composition from being cured on the fiber. Preferably, the fiber coated with the uncured material exits the bath vertically and then passes through a die prior to curing. However, since the fiber coated with the uncured material can exit the bath horizontally, vertically or otherwise, a die is necessary to insure concentricity of the coating on the fiber prior to curing.

Various types of optical fiber are operable in the instant invention, e.g., simple glass or plastic fiber of a uniform refractive index, step-index fiber, a graded index fiber, a multimode fiber, single mode fiber, a low numerical aperture, low loss, glass clad fiber; a medium numerical aperture, medium loss, glass clad fiber; a high numerical aperture, high loss, glass clad fiber and a high numerical aperture, medium loss, glass clad fiber.

As used herein, the terms "optical fiber" and "fiber optic" mean a glass or plastic fiber capable of acting as an optical wave guide.

The following examples will aid in explaining, but should not be deemed as limiting to, the instant invention. In all cases, unless otherwise noted, all parts and percentages are by weight.

EXAMPLE 1

Preparation of Polymer A 253 g of commercially available trimethylol propane diallyl ether (4.54 meq. OH/g) was added dropwise to a 3-necked flask containing 200 g of toluene diisocyanate (an 80/20 mixture of the 2,4 and 2,6 isomers) (11.48 meq. NCO/g). The reaction was continued with stirring at 60° C. for 8 hours. To the reaction product was added 118 g of commercially available di(2-hydroxyethyl)-dimethylhydantoin (8.92 meq. OH/g) of the formula:

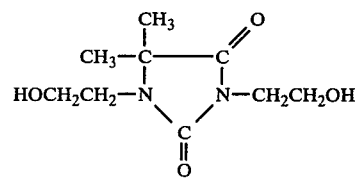

along with 0.25 g. of stannous octoate as a catalyst. Some heat was required to start the reaction and due to the mixture becoming extremely viscous as the reaction proceeds, the temperature had to be raised to 95° C. to insure proper mixing. The reaction was maintained at this temperature until complete as shown by the disappearance of the NCO band by IR. The resulting product of the formula:

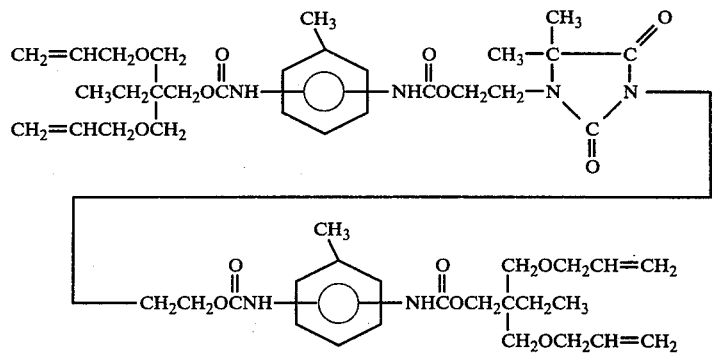

had a glass melting point of 95° C., unsaturation: theory, 4.03 mmoles/g.; found, 4.06 mmoles/g. This polyene prepolymer will hereinafter be referred to as Prepolymer A.

EXAMPLE 2

Preparation of Formulation A

A formulation was made up as follows. 791 g of Prepolymer A prepared as in Example 1 was admixed with 0.59 g of phosphorous acid, 2.38 g of octadecyl-β-(4-hydroxy-3,5-di-t-butyl)phenyl propionate, commercially available from Ciba-Geigy under the tradename "IRGANOX 1076" and 1.19 g of 2,6-di-tert-butyl-4-methyl phenol, commercially available from Shell Chemical Co. under the tradename "Ionol" as stabilizers. The mixture was heated at 50° C. until all the components had dissolved. The resulting solution was blended with 403 g of ethylene glycol-bis (β-mercaptopropionate), commercially available from Evans Chemetics, and 23.88 g of benzophenone. The thus formed formulation will hereinafter be referred to as Formulation A.

EXAMPLE 3

A bead of Formulation A was applied to a vertically moving silica fiber of 5.7 mil diameter. A thin film was then metered onto the fiber by passing through a 11 mil diameter dome die. The coated fiber was passed at 40 fpm through the center of the helical coil of an 8 kw pulsed xenon U.V. lamp to cure the coating. A tough abrasion resistant coating of wall thickness 10 micrometers was formed on the surface of the fiber.

EXAMPLE 4

To a 5 liter 3 neck flask equipped with stirrer, thermometer and vented addition funnel was charged 1827 g 4,4'-methylene-bis(cyclohexylisocyanate), 0.2 g pyrogallol and 2.03 g stannous octoate. Stirring was commenced and 1814.4 g of trimethylol propane diallyl ether was added dropwise by means of the addition funnel over a 2½ hour period allowing the mixture to exotherm to 70° C. from 30° C. After the addition was complete, the reaction was continued at 65° C. for 2½ hours at which time it was allowed to cool to room temperature. The flask was heated to 60°-70° C. and 585 g commercially available allyl diglycol carbonate along with 1 g stannous octoate followed by the dropwise addition over 1¼ hour period of 556.4 g of polycaprolactone polyol commercially available from Union Carbide under the tradename "PCP 0301" having a molecular weight of about 300. The reaction was continued for 2½ hours at which time the NCO content was 0 as measured by infrared analysis. The resultant prepolymer will hereinafter be referred to as Prepolymer B.

EXAMPLE 5

504 g of Prepolymer B from Example 4 was admixed with 296 g of commercially available trimethylol propane tris(3-mercaptopropionate), 8.0 g of benzophenone and 0.24 g of stabilizer. This photocurable composition will hereinafter be referred to as Photocurable Composition B.

EXAMPLE 6

400 g of 4,4'-methylene-bis(cyclohexylisocyanate), 4.86 g triphenyl phosphite and 0.364 g of stannous octoate were charged to a 2 liter resin kettle equipped with stirrer, thermometer and addition funnel. Stirring was commenced and 198.4 g of hydroxylpropylacrylate were added through the addition funnel over a 2 hour period with the temperature rising from 32° to 44° C. The reaction was continued with stirring for 4 hours. 323.85 g of trimethylol propane triacrylate (a reactive curable diluent) along with 0.25 g of hydroquinone was added to the flask and the flask heated to 60° C. 0.379 g of stannous octoate as a catalyst was added to the flask followed by the addition of 373.1 g of a polyol having a functionality of 3, an average molecular weight of 730 and a viscosity of 300 centipoises at 25° C. and commercially available from BASF Wandotte under the tradename "TP-740". The polyol was added over an 1¾ hour period during which time the temperature rose to 70° C.

The reaction was thereafter heated to 80° C. and continued for 12 hours. The resultant triene prepolymer in the reactive curable diluent had a molecular weight of about 1122 and will hereinafter be referred to as Prepolymer Mixture C.

EXAMPLE 7

500 g of Prepolymer Mixture C from Example 6 was admixed with 5 g of 2,2-dimethoxy-2-phenylacetophenone and 1 g of ditertiary butyl phenol as a stabilizer. This photocurable composition will hereinafter be referred to as Photocurable Composition C.

EXAMPLE 8

A 5 mil thick optical fiber was coated by metering on a 2 mil wall thickness of Photocurable Composition B from Example 5 by passing the coated fiber through a dome die with an 11 mil diameter hole. The coated fiber was then exposed for 1 minute on opposite sides with a 4000 watt Berkey-Ascor Addalux lamp. A smooth, abrasion-resistant photopolymer coating was cured on the fiber.

EXAMPLE 9

A 5 mil thick optical fiber was coated by metering on a 2 mil wall thickness of Photocurable Composition C from Example 7 by passing the coated fiber through a dome die with an 11 mil diameter hole. The coated fiber was then exposed for 1 minute on opposite sides to a 4,000 watt Berkey-Ascor Addalux lamp. A smooth, abrasion-resistant photopolymer coating was cured on the fiber.

What is claimed is:

1. A process for forming a continuous flexible adherent cured coating on the surface of a glass optical fiber which comprises immersing said fiber in a bath of a liquid radiation curable composition at a temperature below 90° C. thus coating said optical fiber with said composition passing said coated optical fiber through a die and thereafter exposing said coated optical fiber to radiation from a member of the group consisting of U.V. and high energy ionizing radiation for a time sufficient to cure said coating on said fiber.

2. The process according to claim 1 wherein the radiation curable composition comprises (1) an ethylenically unsaturated polyene containing at least two reactive unsaturated carbon-to-carbon bonds per molecule, (2) a polythiol containing at least two thiol groups per molecule, the total functionality of the unsaturated carbon-to-carbon bonds per molecule in the polyene and the thiol groups per molecule in the polythiol being greater than four.

3. The process according to claim 1 wherein U.V. radiation is used and a photocuring rate accelerator is added to the radiation curable composition.

4. The process according to claim 1 wherein the glass optical fiber is a member of the group consisting of a uniform refractive index glass fiber, a step index fiber, a graded index fiber, a multimode fiber and a single mode fiber.

5. The process according to claim 1 wherein the radiation curable composition comprises:
   (1) at least one addition polymerizable ethylenically unsaturated component capable of forming a high polymer by photoinitiated polymerization in the presence of an addition polymerization initiator therefor activatable by U.V. light and
   (2) a minor amount of such an initiator.

6. The process according to claim 1 wherein the coating has a thickness in the range 0.1 to 10 mils.

* * * * *